US010246251B2

(12) United States Patent
Bodet et al.

(10) Patent No.: US 10,246,251 B2
(45) Date of Patent: Apr. 2, 2019

(54) METERING VALVE ASSEMBLY AND METHOD FOR MANUFACTURING SUCH A VALVE ASSEMBLY

(71) Applicant: LINDAL FRANCE SAS, Briey (FR)

(72) Inventors: Hervé Bodet, Verdun (FR); Jérôme Peltier, Batilly (FR); Eric Gaillard, Dieue sur Meuse (FR)

(73) Assignee: LINDAL FRANCE SAS, Briey (FR)

( * ) Notice: Subject to any disclaimer, the term of this patent is extended or adjusted under 35 U.S.C. 154(b) by 0 days.

(21) Appl. No.: 15/580,159

(22) PCT Filed: May 24, 2016

(86) PCT No.: PCT/EP2016/061683
§ 371 (c)(1),
(2) Date: Dec. 6, 2017

(87) PCT Pub. No.: WO2016/198257
PCT Pub. Date: Dec. 15, 2016

(65) Prior Publication Data
US 2018/0141745 A1    May 24, 2018

(30) Foreign Application Priority Data
Jun. 8, 2015  (FR) ..................... 15 55221

(51) Int. Cl.
*F16K 1/12* (2006.01)
*B65D 83/54* (2006.01)
*G05D 16/06* (2006.01)

(52) U.S. Cl.
CPC ............... *B65D 83/54* (2013.01); *F16K 1/12* (2013.01); *G05D 16/0636* (2013.01)

(58) Field of Classification Search
CPC ........ B65D 83/54; F16K 1/12; G05D 16/0636
(Continued)

(56) References Cited

U.S. PATENT DOCUMENTS 3,235,135 A * 2/1966 Blanie .................... B65D 83/54
222/107
4,433,797 A * 2/1984 Galia .................... G01F 11/086
222/207
(Continued)

FOREIGN PATENT DOCUMENTS

AT        388 715 B    8/1989
EP     0 109 361 A1    5/1984
(Continued)

OTHER PUBLICATIONS

International Preliminary Report on Patentability dated Dec. 12, 2017 in corresponding application No. PCT/EP2016/061683; w/ English translation (12 pages).
(Continued)

*Primary Examiner* — Benjamin R Shaw
(74) *Attorney, Agent, or Firm* — Westerman, Hattori, Daniels & Adrian, LLP (57) ABSTRACT

A metering valve assembly for closing the housing of an aerosol generator includes a valve body (3) provided with a transfer chamber (31) in which is housed a valve (5) movable between a closed position and an open position, and a reservoir (4) in contact with the transfer chamber, constituted by a rigid wall (41), a flexible membrane (42), a planar peripheral edge (411) for attaching the flexible membrane and a bottom wall (413) inside the peripheral edge. A spring element (43) inside the reservoir is constituted by a curved plate having a convex face toward the flexible membrane and designed to deform toward the bottom wall (413) and to allow the flexible membrane (42) to move closer to the rigid wall when the valve is in the open position and to return to its initial shape as soon as the valve returns to the closed position.

23 Claims, 5 Drawing Sheets

(58) Field of Classification Search
USPC .......................................................... 222/200
See application file for complete search history.

(56) References Cited

U.S. PATENT DOCUMENTS

| | | | |
|---|---|---|---|
| 4,595,127 A * | 6/1986 | Stoody | B05B 7/2421 222/135 |
| 4,650,094 A | 3/1987 | Werding | |
| 4,953,759 A | 9/1990 | Schmidt | |
| 5,429,280 A | 7/1995 | Bauer et al. | |
| 8,079,361 B2 * | 12/2011 | Schuler | B65D 83/54 128/200.14 |
| 9,403,636 B2 | 8/2016 | Bodet et al. | |
| 2002/0153389 A1 * | 10/2002 | Creaghan | B05B 7/0037 222/190 |
| 2009/0095289 A1 | 4/2009 | Schuler et al. | |
| 2015/0166323 A1 * | 6/2015 | Tang | B65D 83/0077 222/95 |
| 2015/0353267 A1 * | 12/2015 | Bodet | B65D 83/54 251/318 |

FOREIGN PATENT DOCUMENTS

| | | |
|---|---|---|
| FR | 1 362 475 A | 6/1964 |
| FR | 2 076 684 A5 | 10/1971 |
| FR | 2 687 643 A1 | 8/1993 |
| FR | 3 000 945 A1 | 7/2014 |
| GB | 2 050 303 A | 1/1981 |
| WO | 2004/041340 A2 | 5/2004 |

OTHER PUBLICATIONS

International Search Report and Written Opinion dated Aug. 4, 2016 issued in corresponding application No. PCT/EP2016/061683; w/ English partial translation and partial machine translation (17 pages).

* cited by examiner

METERING VALVE ASSEMBLY AND METHOD FOR MANUFACTURING SUCH A VALVE ASSEMBLY

The invention relates to a metering valve assembly intended for closing the housing of an aerosol generator, comprising in particular a valve body provided with a transfer chamber in which is housed a valve that can move between a closed position, in which, when the valve assembly is mounted on a housing, the transfer chamber is in contact with the inside of the housing, but is not in contact with the outside, and an open position, in which, when the valve assembly is mounted on a housing, the transfer chamber is in contact with the outside, but is not in contact with the inside of the housing, and a reservoir in contact with the transfer chamber, constituted by a rigid wall and a flexible membrane, said rigid wall having a planar peripheral edge for attaching the flexible membrane and a bottom wall located inside the peripheral edge, said reservoir being placed on the valve assembly so that, when the valve assembly is mounted on a housing, it is inside the housing.

Metering valve assemblies for aerosol dispensers whose reservoir is subjected to the pressure of the propellant gas during the opening of the valve assembly are well known in the state of the art. In some, the reservoir is constituted by an annular elastic sleeve placed around the valve body. When the valve assembly is opened, the sleeve deforms and comes to press against the valve body so as to expel the product. Once the valve assembly is closed, the membrane returns to its normal shape and is filled with product. As examples, reference can be made to the documents AT 388715 B, FR 2 076 684 A5. In other cases, a cavity is intended to be covered by an elastic membrane. Here also, the membrane deforms under the effect of pressure when the valve assembly is opened, then returns to its non-distended position when the valve assembly is closed. As an example, reference can be made to the document GB 2 050 303 A.

Reservoirs are also known which are constituted by a rigid wall having a substantially planar peripheral edge on which the flexible membrane is fixed. Such a valve assembly is known for example from the document FR 3 000 945 A1. In this case, the membrane is not elastic, so as to avoid the use of materials that are incompatible with the propellant gases or the products contained in the aerosol cans. When the valve assembly is closed, the pressure inside the reservoir is the same as that prevailing in the housing. In order for the membrane to return to its initial position, it must therefore have a specific shape to which it naturally returns when its two faces are not subjected to a pressure difference. This is a constraint that cannot be met with a simple flexible membrane, for example, made in an aluminum laminate.

The document WO2004/041340A2 discloses a reservoir similar to the previous one, in which a return mechanism such as a spring blade can be provided. However, this document does not give any concrete information on this return mechanism, which is only mentioned in passing.

The objective of the invention is to provide a metering valve assembly according to the preamble which can be filled after the valve assembly has been closed, even without the flexible membrane being elastic or having a preferred specific shape. Another objective of the invention is to be able to use the same mold to manufacture valve assemblies with different doses, by changing only a few parts.

The main objective is achieved by the valve assembly of the invention in which a spring element is placed inside the reservoir, this spring element being designed to deform in the direction of the bottom wall and to allow the flexible membrane to move closer to the rigid wall when the valve is in the open position and to return to its original shape as soon as the valve returns to the closed position. Thanks to the spring element inserted between the flexible membrane and the rigid wall, the membrane returns automatically to its inflated position as soon as there is no longer a pressure difference between its face oriented toward the housing and its face oriented toward the rigid wall. In a simple embodiment, the spring element is constituted by a curved plate having a convex face oriented toward the flexible membrane and a concave face oriented toward the rigid wall.

In order to avoid deforming the spring element excessively, it is preferable to form one or more stops on the bottom wall of the rigid wall and/or on the concave face of the spring element to limit the deformation of the spring element in the direction of the bottom wall. In a first embodiment, the bottom wall of the rigid wall comprises at least one row of several studs, preferably two rows of four studs, which studs constitute stops to limit the deformation of the spring element in the direction of the bottom wall. In a second embodiment, the concave face of the spring element is provided with at least one rib extending preferably from one edge to the other. The two embodiments can be combined.

To facilitate the expulsion of the product out of the reservoir when the valve assembly is open, it is possible to provide a groove in the bottom wall of the rigid wall, this groove being extended by a connecting channel that puts it in contact with the transfer chamber.

The face of the rigid wall oriented toward the flexible membrane can be concave and form a cavity having a peripheral wall that surrounds the bottom wall and connects it to the peripheral edge. In this case, the spring element can comprise two opposite lateral edge faces, said edge faces being inclined so that, in the rest position of the spring, they are supported against the peripheral wall of the cavity of the rigid wall.

Another possibility is for the wall to be flat or convex. In this case, preferably, the spring element comprises two opposite lateral edge faces, and the portion of the face of the rigid wall oriented toward the flexible membrane and located inside the space defined by the peripheral edge is planar or convex, recesses being provided in the rigid wall, in the space located inside the peripheral edge, so that the lateral edge faces of the spring element can bear on the rigid wall.

To simplify the assembly of the metering valve assembly and to prevent the reservoir from protruding too much from the valve body, it is preferable to place it vertically. For this purpose, the rigid wall of the reservoir can be backed against the valve body. For example, the valve body comprises a tubular portion located below and in the extension of the transfer chamber, the rigid wall of the reservoir being backed against this tubular portion, and an inlet channel putting the housing in contact with the transfer chamber being formed in this tubular portion.

The invention also relates to a process for the manufacture of a metering valve assembly according to the invention. In this process, there is provided a step for molding the rigid wall of the reservoir in a mold containing at least a first mold portion designed for molding the face of the rigid wall oriented toward the flexible membrane, as well as a step for molding the spring element in a mold containing at least a second mold portion designed for molding the concave face of the spring element.

In order to make it possible to use the main portion of the mold regardless of the volume of the reservoir, there are provided, in the first mold or in the second mold, interchangeable removable parts, which make it possible, depending on the selected parts, to play with the position of the bottom wall relative to the peripheral edge, or with the lengths of the stops formed in the bottom wall or on the concave face of the spring element.

In a first variant of the process, the first mold portion, intended for molding the face of the rigid wall oriented toward the flexible membrane, is provided with one or more recesses for molding one or more stops on the bottom wall, removable elements of a set of interchangeable removable elements of different sizes being able to take place in these recesses in order to vary the height of the stop or stops relative to the bottom wall depending on the selection of the removable elements.

In a second variant, the second mold portion, intended for molding the concave face of the spring element, is provided with one or more recesses for molding one or more stops on the concave face of the spring element, removable elements of a set of interchangeable removable elements of different sizes being able to take place in these recesses in order to vary the height of the stop or stops relative to the concave face of the spring element depending on the selection of the removable elements.

A third variant provides the first mold portion, intended for molding the face of the rigid wall oriented toward the flexible membrane, with a housing in which a part of a set of interchangeable parts having different heights and shapes can take place in order to form the bottom wall with different shapes and/or different positions relative to the peripheral edge depending on the selection of the interchangeable part.

The valve assembly of the invention is particularly well suited to an aerosol can subjected to a pressure of compressed air or nitrogen. The invention therefore also relates to an aerosol container comprising a metering valve assembly according to the invention, mounted on a housing containing a product to be dispensed and a propellant gas, said propellant gas being preferably compressed air or compressed nitrogen.

In order to improve the quality of the spray, it may be useful to associate the metering valve assembly of the invention with a diffuser provided with a flow regulator of the type developed by the company Schaller "Air Spray Technology", Bassecourt, Switzerland, and marketed for a time by the company Novospray SA, Geneva, Switzerland. This flow regulator comprises a piston movable between a closed position in which it does not allow the product to pass although the valve assembly is open and an open position which allows the product to pass through when the valve assembly is open, the piston passing into the open position when the pressure of the product exiting the valve assembly reaches or exceeds a setpoint value and returning to the closed position as soon as the pressure of the product exiting the valve assembly falls below the setpoint value.

The invention is described in more detail with the aid of the following figures.

Figure 1:
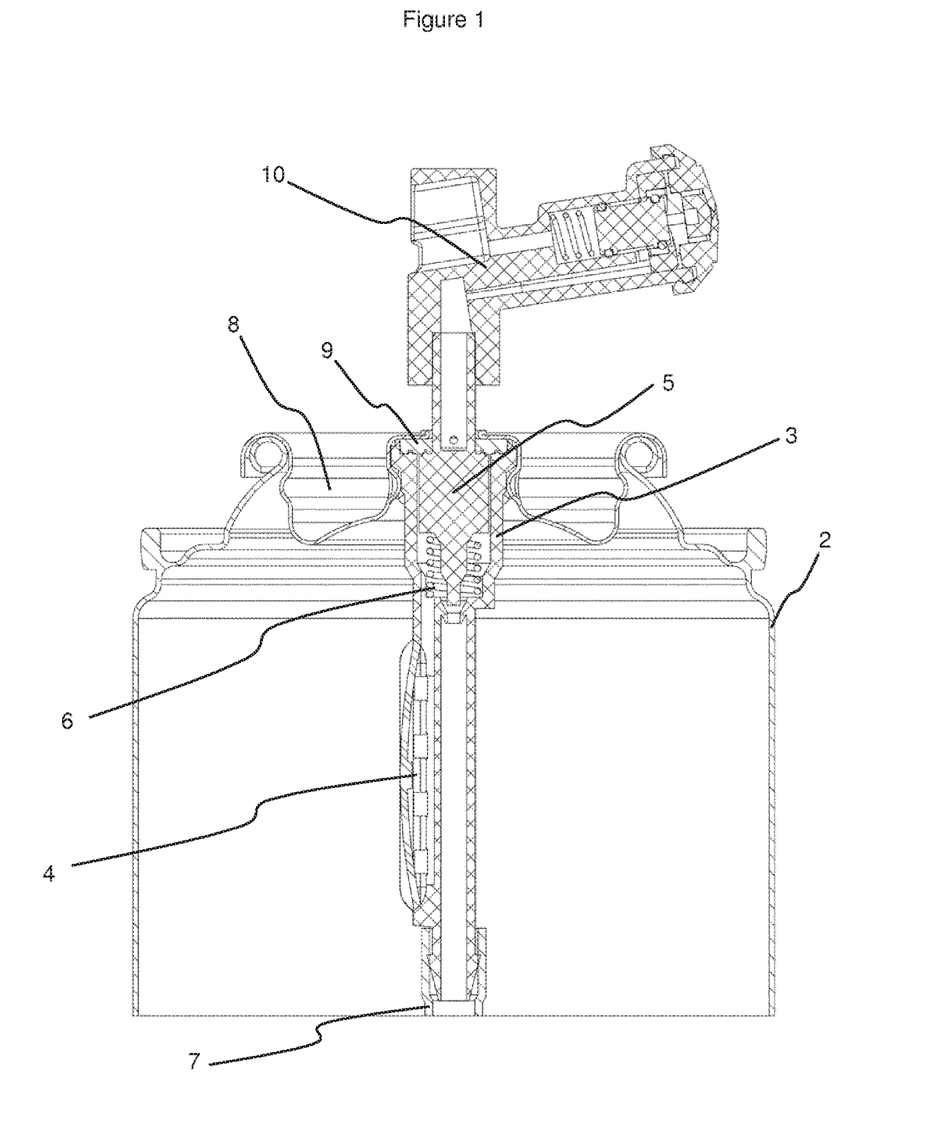
FIG. 1: a cross-sectional view of a valve assembly according to the invention mounted in an aerosol generator and provided with a diffuser equipped with a flow regulator of the Schaller/Novospray type.
Figure 2:
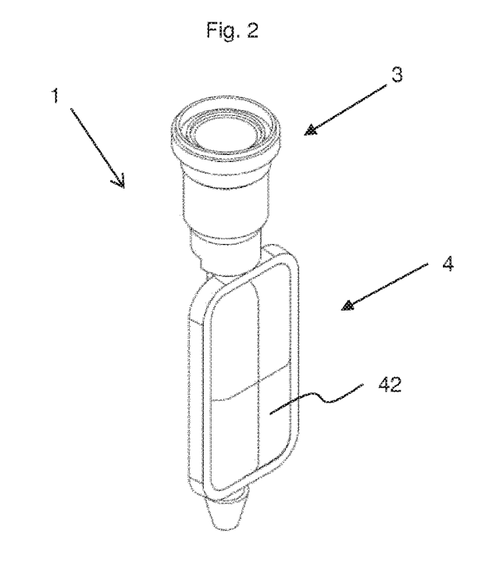
FIG. 2: a front perspective view of the assembly constituted by the valve body and the reservoir according to the invention.
Figure 3:
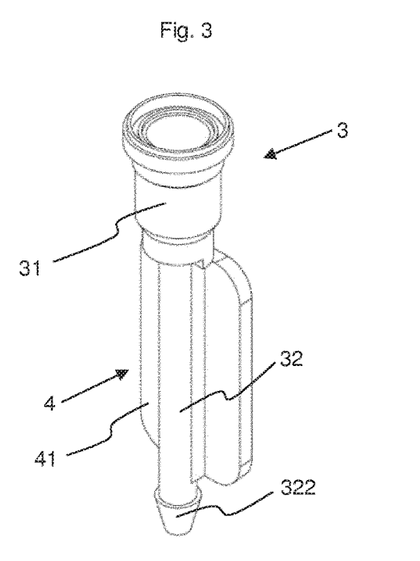
FIG. 3: a rear perspective view of the valve body/reservoir assembly of FIG. 2.
Figure 4:
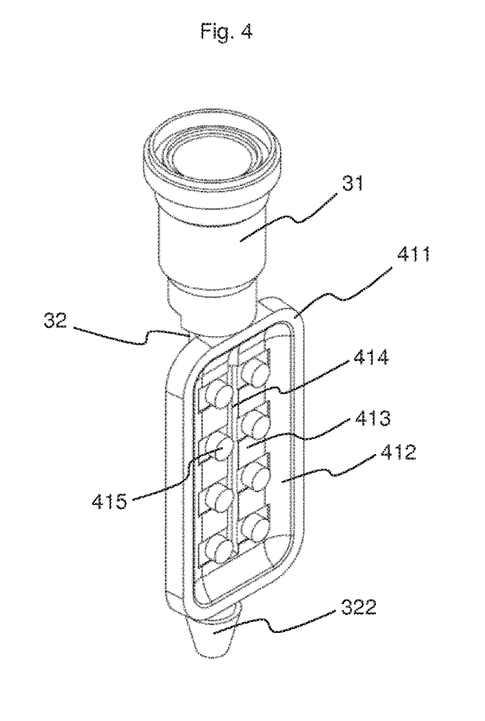
FIG. 4: a perspective view of the valve body/reservoir assembly of FIG. 2 without the flexible membrane and without the spring element.
Figure 5:
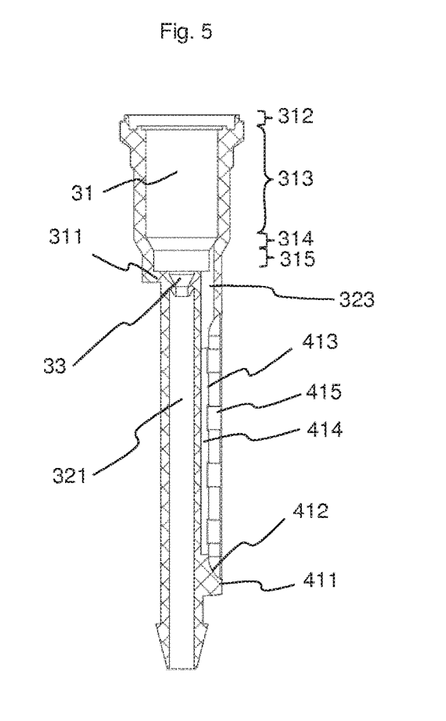
FIG. 5: a side cross-sectional view of the valve body/reservoir assembly of FIG. 2 without the flexible membrane and without the spring element.
Figure 6:
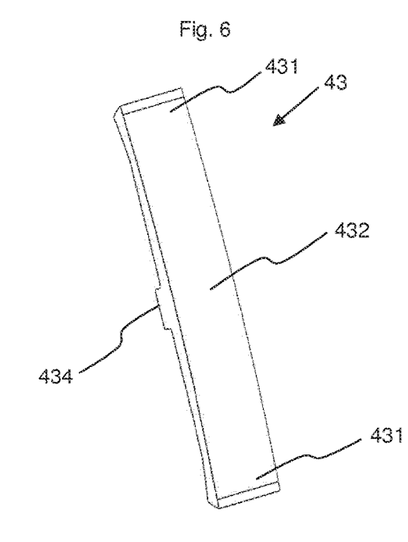
FIG. 6: a perspective view of the convex face of the spring element.
Figure 7:
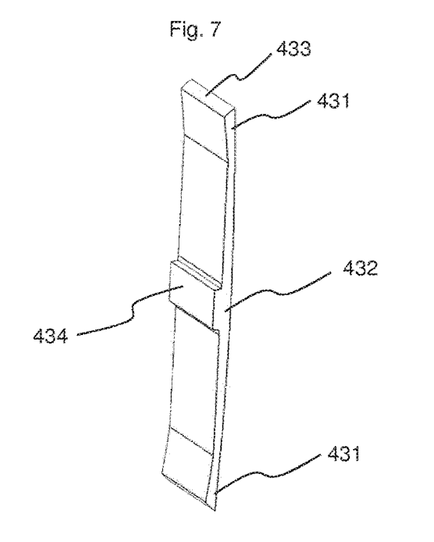
FIG. 7: a perspective view of the concave face of the spring element of FIG. 6.
Figure 8:
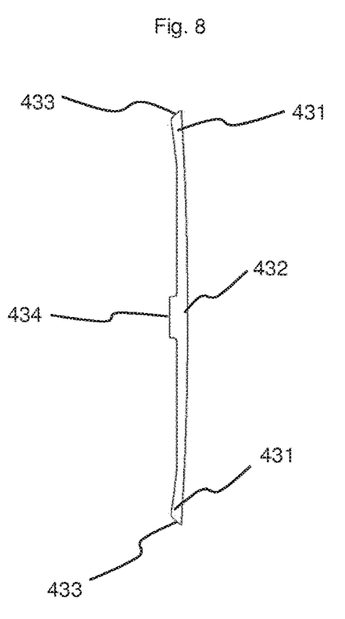
FIG. 8: a side view of the spring element of FIG. 6.
Figure 9:
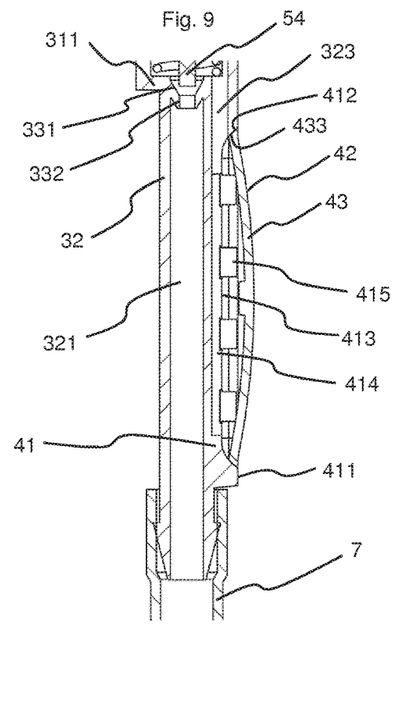
FIG. 9: a cross-sectional view through the reservoir and a portion of the valve body when the valve assembly is in the closed position.
Figure 10:
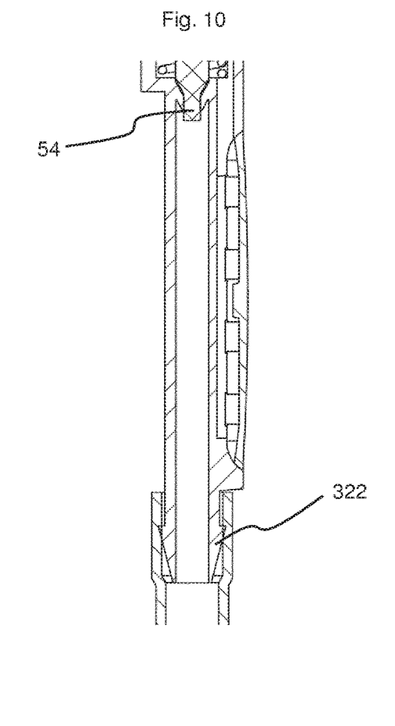
FIG. 10: a cross-sectional view through the reservoir and a portion of the valve body when the valve assembly is in the open position.
Figure 11:
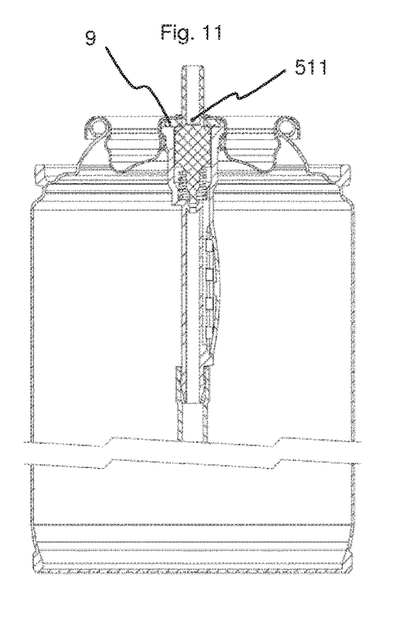
FIG. 11: a cross-sectional view through the valve assembly in the closed position.
Figure 12:
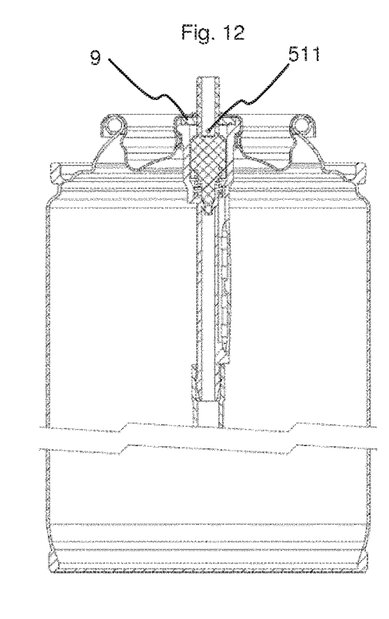
FIG. 12: a cross-sectional view through the valve assembly in the open position.

For the sake of clarity of the description, spatial references such as "lower" and "upper" or "high" and "low" are used. These references refer to the valve assembly as shown in FIG. 1, with the outlet opening oriented upwards. This does not prevent the valve assembly from being used in another position. In addition, the majority of the parts have, except for a few elements, symmetry of rotation about the vertical axis passing through the center of the valve and the housing. The adjectives "axial" or "radial" refer to this vertical axis of symmetry.

The invention relates to a metering valve assembly (1) intended to be placed on the neck of a housing (2). Although this is not shown, the valve assembly can be provided with a pouch. It is essentially constituted by a valve body (3) to which is associated a reservoir (4), a valve (5), commonly called stem, which is held in the closed position by a spring (6), and a cup (8). The valve body can be extended by a dip tube (7).

Figure 13:
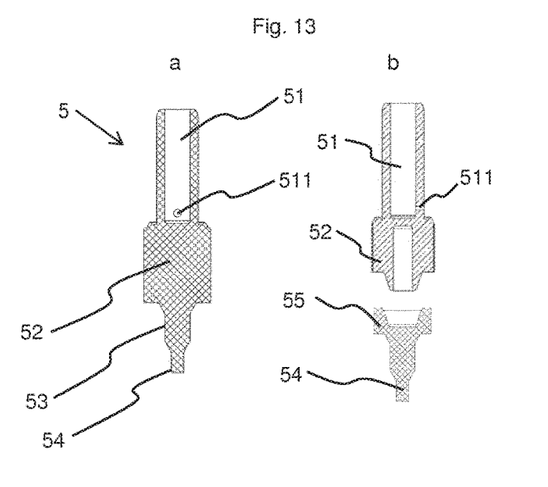
FIG. 13: a cross-sectional view (a) of a one-piece valve and (b) of a two-piece valve.

In a common manner, the valve (5) comprises an upper portion in which is formed an axial outlet channel (51) which opens upwards. One or more orifices (511) are placed at the bottom of the outlet channel and put the bottom of this channel in contact with the outer face of the valve. The upper portion is extended downwards by a wider central portion (52) provided on its outer face with vertical grooves (not visible) which allow the product to pass along this central portion. Below the central portion, the valve is extended by a narrower lower portion (53) which ends with a tip (54). The valve may be in a single piece (FIG. 13a) or consist of a conventional stem to which is added an end piece (55) carrying the tip (FIG. 13b).

The metering valve assembly of the invention differs from that of the state of the art by its valve body (3) and the reservoir (4) associated therewith. The valve body comprises an upper portion that is extended downwards by a tubular portion to which the reservoir (4) is attached.

The upper portion of the valve body is cylindrical and provides a transfer chamber (31) that is open upwards and closed at the bottom by a partition wall (311). This transfer chamber is intended to receive the valve (5) and the spring (6). It is divided in four successive sections having different diameters, which become narrower from top to bottom. The first section (312), located at the top of the transfer chamber, includes a space intended for accommodating the seal (9) that surrounds the valve (5). The second section (313), of cylindrical shape, serves to house the valve. Its diameter is slightly greater than the diameter of the central portion (52) of the valve, so that the latter can slide without friction in the second section of the transfer chamber. The third section (314) serves to connect the second (313) to the fourth (315). It has a frustoconical shape whereas the fourth (315) has a cylindrical shape, and its diameter is smaller than that of the second section. The fourth section serves to receive and guide the spring (6). It ends with the partition wall (311). The third and fourth sections (314, 315) could be replaced by radial ribs whose upper edge faces would be inclined downwards. At the level of the first section and the top of the second section, the outer face of the upper portion forms a ring that serves to secure the valve body in the cup.

An inlet channel (321) passes through the tubular portion (32) of the valve body from one side to the other. The lower end (322) of the tubular portion is provided with means for attaching a dip tube (7). A funnel-shaped passage (33) is provided in the partition wall (311) to put the transfer chamber (31) in contact with the inlet channel (321). The funnel has a frustoconical upper portion (331) that narrows in a downward direction and ends with a bottom cylindrical portion (332). The cylindrical portion of the funnel is narrower than the inlet channel (321) of the tubular portion (32) and forms a kind of circular lip oriented downwardly. This lip allows a greater tolerance on the diameter of the tip (54) of the valve in order to ensure the sealing between the tip and the valve body. The outer diameter of the tip (54) of the valve is equal to or just slightly greater than the inner diameter of the cylindrical portion (332) of the funnel-shaped passage.

The reservoir (4) is placed against the tubular portion (32) of the valve body. This reservoir is constituted essentially by a rigid wall (41) and a flexible membrane (42) fixed by its peripheral edge to the peripheral edge (411) of the rigid wall, for example, by welding. The peripheral edge (411) is preferably substantially planar. The rigid wall has a substantially rectangular shape having two lateral edges (short edges) and two longitudinal edges (long edges). These edges can be raised relative to the center of the wall so as to form a bottom wall (413) and a peripheral wall (412) placed between the bottom wall and the peripheral edge (411). In this case, a shallow cavity is thus formed on the face oriented toward the flexible membrane. The inner face of the peripheral wall (412) is preferably inclined relative to the bottom wall (413) and the junction between the bottom wall and the peripheral edge is rounded to avoid forming an angle. In the example presented here, the peripheral wall (412), at the peripheral edge (411), forms an angle of about 45° relative to the bottom wall (413). To simplify manufacture, the angles of the rigid wall are rounded. The rigid wall (41) is contiguous to the tubular portion (32) of the valve body so that the reservoir extends vertically. The valve body with its tubular portion and the rigid wall thus form a single piece. A connecting channel (323) connects the reservoir to the transfer chamber (31) in which it opens by passing through the partition wall (311).

In the use position, the reservoir (4) is located inside the housing. The flexible membrane (42) is subjected to the pressure prevailing in the reservoir. At the time of filling the reservoir, when the valve assembly is closed, the pressure prevailing in the reservoir is the same as that to which the product in the housing is subjected. According to the invention, there is provided inside the reservoir (4) a spring element (43) whose function is to force the flexible membrane (42) to move away from the rigid portion (41) so that the product contained in the housing enters the reservoir.

This spring element (43) is constituted by a rectangular plate sized to fit in the reservoir (4). The plate is slightly bent so that its lateral edges (short edges) (431) project on a same side relative to the central portion (432) of the plate. The lateral outer edge faces (433) are inclined so that they can bear on the inclined edges of the peripheral wall (412) of the cavity. The plate thus has a convex face intended to be in contact with the flexible membrane (42) and a concave face intended to be oriented toward the cavity of the rigid wall (41). The dimensions of the spring element are selected so that, in the rest position, it comes to bear by its lateral edge faces (433) against the inclined lateral edges of the cavity, its convex face being flush with the peripheral edge (411) of the rigid wall. The width of the plate is slightly less than the width of the cavity of the wall (41). The spring element is sufficiently flexible, firstly, to deform in the direction of the bottom wall (413) under the effect of the pressure in the housing when the valve assembly is open, even when the aerosol generator is almost empty, and secondly, to return to its initial position as soon as the passage (33) is open and the pressure prevailing inside the reservoir is the same as that prevailing in the housing (2).

In the assembled state, the coil spring (6) is placed in the fourth section (315) of the upper portion of the valve body. It bears against the partition wall (311). The central portion (52) of the valve is placed in the second section (313), with its tip (54) passing through the spring (6) and penetrating into the frustoconical portion (331) of the funnel of the passage (33) located between the transfer chamber (31) and the inlet channel (321), but without obstructing the cylindrical portion (332) of this passage. The spring presses on the lower face of the lower portion (53) of the valve. It thus tends to push the valve upwards. The seal (9) is slid down over the upper portion of the valve, and is located at the level of the openings (511) that it closes. It is placed in the space provided for this purpose in the first section (312) of the transfer chamber of the upper portion of the valve body. The valve assembly is closed at the top by the cup (8). The reservoir is obtained by fixing the peripheral edge of the flexible membrane (42) on the peripheral edge (411) of the rigid wall (41) with interposition of a spring element (43). The attachment can be done by any appropriate means, such as welding or gluing.

The valve assembly is thus in a rest position. The pressurized product contained in the housing (2) rises in the dip tube (7), then in the inlet channel (321), and it fills the transfer chamber (31) up to the seal (9). It also penetrates into the reservoir (4) by passing through the connecting channel (323). The product cannot leave the valve assembly, because the seal (9) is in front of the orifices (511) which are thus blocked.

When pressure is applied downwardly on the valve, the valve moves within the valve body against the effect of the spring (6). Its tip (54) penetrates into the cylindrical portion (332) of the passage which puts the transfer chamber in contact with the inlet channel: the passage is blocked, the product can no longer pass from the inlet channel (321) into the transfer chamber (31). In parallel, the orifices (511) of the valve move away from the seal (9) so as to open a passageway for the product contained in the transfer chamber (31) to penetrate into the outlet channel (51) of the valve and exit the valve assembly. A pressure difference is created between the reservoir (4) whose flexible membrane (42) is subjected to the internal pressure of the housing (generally between 1 and 10 bar) and the open end of the outlet channel which is at ambient pressure. The flexible membrane (42) transmits the pressure to the spring element (43) which deforms in the direction of the cavity. The product contained in the reservoir is expelled via the connecting channel (323) into the transfer chamber and from there into the outlet channel.

When the pressure exerted on the valve is removed, the spring (6) pushes the valve (5) into the rest position. The orifices (511) are again aligned with the seal (9): the outlet passage is closed. The tip (54) leaves the cylindrical portion (332) of the passageway located between the inlet channel (321) and the transfer chamber (31), thereby bringing these two portions in contact.

To prevent a short circuit from occurring at the time of opening the valve assembly, the tip (54) of the valve is dimensioned so that it obstructs the passage (33) before the orifices (511) of the valve move away from the seal (9). Similarly, at the time of closing of the valve assembly, the tip leaves the cylindrical portion (332) of the passage and releases it only after the orifices have been blocked again by the seal (9).

The amount of product expelled at each use depends on the amount of deformation of the spring element. It is thus possible, in accordance with the invention, to adjust the volume of product expelled by modifying the deformation capacity of the spring element. For this purpose, several possibilities exist: selecting a more or less deformable material, selecting a greater or smaller thickness for the spring element, or limiting the possibility for the element spring to deform beyond a certain point, although its physical characteristics would allow it.

In a first embodiment, the bottom wall (413) of the cavity is located more or less away from the peripheral edge (411). During expulsion of the product, the concave face of the spring element is deformed and comes to bear against the rigid wall (41). It can be provided that there is no cavity and that the rigid wall (41) is planar, or even curved to further reduce the volume. In both cases, it is preferable to provide two grooves near the lateral edge (411) of the rigid wall, so that the edge faces (433) of the spring element can be supported thereon. In order to facilitate the expulsion of the product when the spring element is pressed against the bottom wall, it is preferable to provide a central groove (414) in the bottom wall (413). The central groove extends from one end to the other of the bottom wall and is extended beyond the upper peripheral edge by the connecting channel (323).

In order to be able to use the same press for different volumes of the reservoir, it can be provided to place an interchangeable insert in a housing provided for this purpose in the mold core that makes the face of the rigid wall oriented toward the membrane. This insert makes it possible, depending on its thickness, to move the bottom wall (413) more or less relative to the peripheral edge (411). When manufacturing the reservoir (4), it will be sufficient to select an insert corresponding to the desired volume. The rest of the mold remains unchanged. It is also possible to provide that the inserts give different shapes to the face of the rigid wall oriented toward the flexible membrane (concave face, planar face, convex face, with or without grooves for the edge faces of the spring element, etc.).

An alternative to this solution is to leave the bottom wall (413) in a relatively deep position that can be suitable for larger volumes, and to provide it with stops (415) whose heights define limits to the deformation of the element spring. These stops can take the form of cylindrical studs.

Since the pressure prevailing in the reservoir before the first use is relatively high (up to 10 bar for pressurized air bottles), it is preferable to provide several stops to prevent the spring element (43) from deforming beyond the desired point in the portions where it is not retained by a stop (413). The top of the stops is at the level that the bottom wall would have had in the previous example. This solution makes it possible to save material. In the example presented here, eight studs (411) are distributed at the bottom of the cavity of the rigid wall, in two rows of four.

For manufacturing, recesses can be provided in the core intended to form the bottom wall (413) of the cavity, longer or shorter interchangeable rods being inserted in these recesses depending on the height desired for the studs. The same mold can thus be used for different volumes, simply by interchanging the rods.

Another alternative is to provide in the rigid wall a cavity having a depth adapted to the largest volumes, and to provide on the concave face of the spring element (43) one or more ribs (434) that come to abut against the bottom wall when the spring element is deformed. The more the ribs protrude from the concave face, the less the spring element can deform in the direction of the bottom wall. These ribs preferably extend from one longitudinal edge (long edge) to the other. The example presented here combines the solutions of the studs and of the rib (434).

For molding, the same mold is used to manufacture all the valve body/rigid wall (41) parts, and only the core of the mold that manufactures the spring element is modified. For this purpose, there is provided, in the mold that serves for forming the concave face of the spring element, one or more recesses in which are inserted interchangeable inserts having greater or smaller heights, depending on the desired height for the ribs.

By providing stops (415, 434) or a proper positioning of the bottom wall (413), excessive deformation of the spring element is avoided.

The flexible membrane (42) is preferably preformed before attaching it to the peripheral edge (411) of the rigid wall. For this purpose, a suction cup which deforms the flexible membrane to give it substantially the shape of the convex wall of the spring element (43) can be used, for example.

Figure 14:
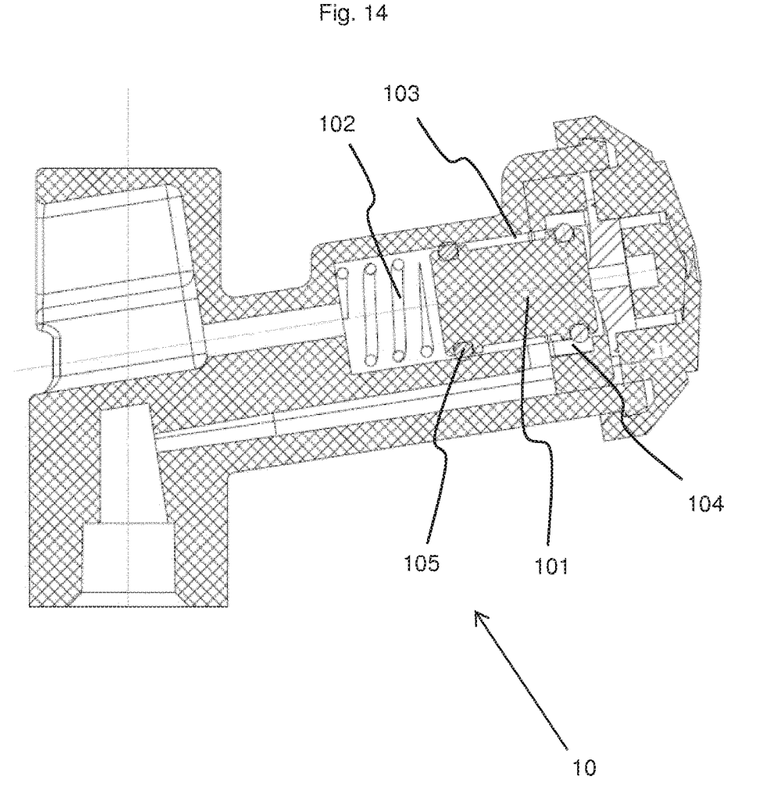
FIG. 14: a cross-sectional view of a diffuser provided with a flow regulator of the Schaller/Novospray type.

The metering valve assembly of the invention is particularly well suited to generators of pressurized aerosol of compressed air or nitrogen. This means that the pressure inside the housing decreases as the doses are withdrawn. When the generator is nearly empty, the pressure under which the product is expelled from the reservoir may be insufficient to form a quality aerosol and droplets may form. To avoid this phenomenon, the valve assembly of the invention can be associated with a diffuser (10) equipped with a flow regulator of the type Schaller/Novospray regulator. This regulator, developed by the company Schaller "Air Spray Technology" and marketed for some time by the company Novospray SA, is composed of a piston (101) that can move between a closed position (shown in FIG. 14) in which the product cannot exit, and an open position, in which the product can exit. A spring (102) holds the piston in the closed position. When the product is expelled from the reservoir (4), it passes through the outlet channel (51) and penetrates into a piston chamber (103), passes through a passage (104) and is on the front face of the piston. An O-ring (105) prevents the product from passing to the side of the spring. The pressure exerted by the product on the front face of the piston is substantially the same as that prevailing in the housing (2). As long as this pressure is greater than the force exerted by the spring on the piston, the piston recoils, freeing the access to the outlet of the diffuser. When the pressure prevailing in the reservoir (4) falls below the pressure exerted by the spring, the spring pushes the piston back into the closed position and the product can no longer exit.

The flexible membrane is preferably made of a flexible, but not spring, material. Among the suitable materials for the metering valve assembly of the invention, mention will be made of multilayer laminates with or without aluminum. The valve body and the valve are made in a thermoplastic material, for example. The metering valve assembly of the invention is particularly well suited for use in an aerosol generator whose propellant gas is compressed air or nitrogen. However, it can be used with other gases, and in particular with liquefied gas.

LIST OF REFERENCES

1 Metering valve assembly
2 Housing
3 Valve body
  31 Transfer chamber
    311 Partition wall
    312 1st section
    313 2nd section
    314 3rd section
    315 4th section
  32 Tubular portion
    321 Inlet channel
    322 Means for fixing the dip tube
    323 Connecting channel
  33 Passage
    331 Frustoconical upper portion
    332 Cylindrical lower portion
4. Reservoir
  41 Rigid wall
    411 Peripheral edge
    412 Peripheral wall
    413 Bottom wall
    414 Central groove
    415 Stop studs
  42 Flexible membrane
  43 Spring element
    431 Lateral edges
    432 Central portion
    433 Lateral edge faces
    434 Horizontal rib
5. Valve
  51 Exit channel
    511 Orifices
  52 Central portion
  53 Lower portion
  54 Tip
  55 End piece
6. Spring
7. Dip tube
8. Cup
9. Internal seal
10. Diffuser
  101 Piston
  102 Piston spring
  103 Piston chamber
  104 Passage
  105 O-ring

The invention claimed is:

1. Metering valve assembly intended for closing the housing of an aerosol generator, comprising:
a valve body provided with a transfer chamber in which is housed a valve movable between a closed position, in which, when the valve assembly is mounted on a housing, the transfer chamber is in contact with the inside of the housing, but is not in contact with the outside, and an open position, in which, when the valve assembly is mounted on a housing, the transfer chamber is in contact with the outside, but is not in contact with the inside of the housing,
a reservoir in contact with the transfer chamber, constituted by a rigid wall and a flexible membrane, the rigid wall having a planar peripheral edge for attaching the flexible membrane and a bottom wall located inside the peripheral edge, the reservoir being placed on the valve assembly so that, when the valve assembly is mounted on a housing, it is inside the housing, and
a spring element placed inside the reservoir, the spring element being designed to deform in the direction of the bottom wall and to allow the flexible membrane to move closer to the rigid wall when the valve is in the open position and to return to its initial shape as soon as the valve returns to the closed position,
wherein the spring element is constituted by a curved plate having a convex face oriented toward the flexible membrane and a concave face oriented toward the rigid wall,
wherein one or more stops are formed on the bottom wall of the rigid wall and/or on the concave face of the spring element to limit the deformation of the spring element in the direction of the bottom wall.

2. Metering valve assembly according to claim 1, wherein the bottom wall of the rigid wall comprises at least one row of several studs constituting stops to limit the deformation of the spring element in the direction of the bottom wall.

3. Metering valve assembly according to claim 1, wherein the concave face of the spring element is provided with at least one rib.

4. Metering valve assembly according to claim 1, wherein a groove is formed in the bottom wall of the rigid wall, the groove being extended by a connecting channel which puts it in contact with the transfer chamber.

5. Metering valve assembly according to claim 1, wherein the face of the rigid wall oriented toward the flexible membrane is concave and forms a cavity having a peripheral wall that surrounds the bottom wall and connects the bottom wall to the peripheral edge.

6. Metering valve assembly according to claim 5, wherein the spring element comprises two opposite lateral edge faces, the edge faces being inclined so that, in the rest position of the spring, they are supported on the peripheral wall of the cavity of the rigid wall.

7. Metering valve assembly according to claim 1, wherein the spring element comprises two opposite lateral edge faces, and the portion of the face of the rigid wall oriented toward the flexible membrane and located inside the space defined by the peripheral edge is planar or convex, recesses being provided in the rigid wall, in the space located inside the peripheral edge, so that the lateral edge faces of the spring element can bear on the rigid wall.

8. Metering valve assembly according to claim 1, wherein the reservoir is placed vertically.

9. Metering valve assembly according to claim 8, wherein the rigid wall of the reservoir is backed against the valve body.

10. Metering valve assembly according to claim 1, wherein the valve body comprises a tubular portion located below and in the extension of the transfer chamber, the rigid wall of the reservoir being backed against this tubular portion, and an inlet channel putting the housing in contact with the transfer chamber being formed in the tubular portion.

11. Metering valve assembly according to claim 1, wherein the valve assembly is mounted on a housing containing a product to be dispensed and a propellant gas.

12. Metering valve assembly according to claim 1, wherein the valve assembly is provided with a diffuser provided with a flow regulator, the flow regulator comprising a piston movable between a closed position in which the piston does not let the product pass through when the valve assembly is open, and an open position that lets the product pass through when the valve assembly is open, wherein the piston moves into the open position when the pressure of the product exiting the valve assembly reaches or exceeds a setpoint value and the piston returns into the closed position as soon as the pressure of the product exiting the valve assembly falls below the setpoint value.

13. Process of manufacturing a metering valve assembly, wherein the metering valve assembly is a valve assembly intended for closing the housing of an aerosol generator, comprising:
   a valve body provided with a transfer chamber in which is housed a valve movable between a closed position, in which, when the valve assembly is mounted on a housing, the transfer chamber is in contact with the inside of the housing, but is not in contact with the outside, and an open position, in which, when the valve assembly is mounted on a housing, the transfer chamber is in contact with the outside, but is not in contact with the inside of the housing,
   a reservoir in contact with the transfer chamber, constituted by a rigid wall and a flexible membrane, the rigid wall having a planar peripheral edge for attaching the flexible membrane and a bottom wall located inside the peripheral edge, the reservoir being placed on the valve assembly so that, when the valve assembly is mounted on a housing, it is inside the housing, and
   a spring element placed inside the reservoir, the spring element being designed to deform in the direction of the bottom wall and to allow the flexible membrane to move closer to the rigid wall when the valve is in the open position and to return to its initial shape as soon as the valve returns to the closed position,
   wherein the spring element is constituted by a curved plate having a convex face oriented toward the flexible membrane and a concave face oriented toward the rigid wall,
   the process comprising:
   molding the rigid wall of the reservoir in a mold containing at least a first mold portion designed for molding the face of the rigid wall oriented toward the flexible membrane, and
   molding the spring element in a mold containing at least a second mold portion designed for molding the concave face of the spring element.

14. Process according to claim 13, wherein the first mold portion, intended for molding the face of the rigid wall oriented toward the flexible membrane, is provided with one or more recesses for molding one or more stops on the bottom wall, removable elements of a set of interchangeable removable elements of different sizes being able to take place in these recesses in order to vary the height of the stop or stops relative to the bottom wall depending on the selection of the removable elements.

15. Process according to claim 13, wherein the second mold portion, intended for molding the concave face of the spring element, is provided with one or more recesses for molding one or more stops on the concave face of the spring element, removable elements of a set of interchangeable removable elements of different sizes being able to take place in these recesses in order to vary the height of the stop or stops relative to the concave face of the spring element depending on the selection of the removable elements.

16. Process according to claim 13, wherein the first mold portion, intended for molding the face of the rigid wall oriented toward the flexible membrane, is provided with a housing in which a part of a set of interchangeable parts having different heights and shapes can take place in order to form the bottom wall with different shapes and/or with different positions relative to the peripheral edge depending on the selection of the interchangeable part.

17. Process according to claim 14, wherein the second mold portion, intended for molding the concave face of the spring element, is provided with one or more recesses for molding one or more stops on the concave face of the spring element, removable elements of a set of interchangeable removable elements of different sizes being able to take place in these recesses in order to vary the height of the stop or stops relative to the concave face of the spring element depending on the selection of the removable elements.

18. Process according to claim 14, wherein the first mold portion, intended for molding the face of the rigid wall oriented toward the flexible membrane, is provided with a housing in which a part of a set of interchangeable parts having different heights and shapes can take place in order to form the bottom wall with different shapes and/or with different positions relative to the peripheral edge depending on the selection of the interchangeable part.

19. Process according to claim 15, wherein the first mold portion, intended for molding the face of the rigid wall oriented toward the flexible membrane, is provided with a housing in which a part of a set of interchangeable parts having different heights and shapes can take place in order to form the bottom wall with different shapes and/or with different positions relative to the peripheral edge depending on the selection of the interchangeable part.

20. Metering valve assembly intended for closing the housing of an aerosol generator, comprising:
   a valve body provided with a transfer chamber in which is housed a valve movable between a closed position, in which, when the valve assembly is mounted on a housing, the transfer chamber is in contact with the inside of the housing, but is not in contact with the outside, and an open position, in which, when the valve assembly is mounted on a housing, the transfer chamber is in contact with the outside, but is not in contact with the inside of the housing,
   a reservoir in contact with the transfer chamber, constituted by a rigid wall and a flexible membrane, the rigid wall having a planar peripheral edge for attaching the flexible membrane and a bottom wall located inside the peripheral edge, the reservoir being placed on the valve assembly so that, when the valve assembly is mounted on a housing, it is inside the housing, and
   a spring element placed inside the reservoir, the spring element being designed to deform in the direction of the bottom wall and to allow the flexible membrane to move closer to the rigid wall when the valve is in the open position and to return to its initial shape as soon as the valve returns to the closed position, wherein the spring element is constituted by a curved plate having a convex face oriented toward the flexible membrane and a concave face oriented toward the rigid wall, wherein a groove is formed in the bottom wall of the rigid wall, the groove being extended by a connecting channel which puts it in contact with the transfer chamber.

21. Metering valve assembly intended for closing the housing of an aerosol generator, comprising:

a valve body provided with a transfer chamber in which is housed a valve movable between a closed position, in which, when the valve assembly is mounted on a housing, the transfer chamber is in contact with the inside of the housing, but is not in contact with the outside, and an open position, in which, when the valve assembly is mounted on a housing, the transfer chamber is in contact with the outside, but is not in contact with the inside of the housing, a reservoir in contact with the transfer chamber, constituted by a rigid wall and a flexible membrane, the rigid wall having a planar peripheral edge for attaching the flexible membrane and a bottom wall located inside the peripheral edge, the reservoir being placed on the valve assembly so that, when the valve assembly is mounted on a housing, it is inside the housing, and a spring element placed inside the reservoir, the spring element being designed to deform in the direction of the bottom wall and to allow the flexible membrane to move closer to the rigid wall when the valve is in the open position and to return to its initial shape as soon as the valve returns to the closed position, wherein the spring element is constituted by a curved plate having a convex face oriented toward the flexible membrane and a concave face oriented toward the rigid wall, wherein the face of the rigid wall oriented toward the flexible membrane is concave and forms a cavity having a peripheral wall that surrounds the bottom wall and connects the bottom wall to the peripheral edge.

22. Metering valve assembly according to claim 21, wherein the spring element comprises two opposite lateral edge faces, the edge faces being inclined so that, in the rest position of the spring, they are supported on the peripheral wall of the cavity of the rigid wall.

23. Metering valve assembly intended for closing the housing of an aerosol generator, comprising:

a valve body provided with a transfer chamber in which is housed a valve movable between a closed position, in which, when the valve assembly is mounted on a housing, the transfer chamber is in contact with the inside of the housing, but is not in contact with the outside, and an open position, in which, when the valve assembly is mounted on a housing, the transfer chamber is in contact with the outside, but is not in contact with the inside of the housing, a reservoir in contact with the transfer chamber, constituted by a rigid wall and a flexible membrane, the rigid wall having a planar peripheral edge for attaching the flexible membrane and a bottom wall located inside the peripheral edge, the reservoir being placed on the valve assembly so that, when the valve assembly is mounted on a housing, it is inside the housing, and a spring element placed inside the reservoir, the spring element being designed to deform in the direction of the bottom wall and to allow the flexible membrane to move closer to the rigid wall when the valve is in the open position and to return to its initial shape as soon as the valve returns to the closed position, wherein the spring element is constituted by a curved plate having a convex face oriented toward the flexible membrane and a concave face oriented toward the rigid wall, wherein the spring element comprises two opposite lateral edge faces, and the portion of the face of the rigid wall oriented toward the flexible membrane and located inside the space defined by the peripheral edge is planar or convex, recesses being provided in the rigid wall, in the space located inside the peripheral edge, so that the lateral edge faces of the spring element can bear on the rigid wall.

* * * * *